(12) United States Patent
Waggoner et al.

(10) Patent No.: US 10,843,142 B2
(45) Date of Patent: Nov. 24, 2020

(54) ADDITIVE DELIVERY CONTROL SYSTEMS AND METHODS

(71) Applicant: CIRKUL, INC., Sarasota, FL (US)

(72) Inventors: Garrett S. Waggoner, Sarasota, FL (US); Andrew Gay, Mill Creek, WA (US); David W Baarman, Fennville, MI (US)

(*) Notice: Subject to any disclaimer, the term of this patent is extended or adjusted under 35 U.S.C. 154(b) by 4 days.

(21) Appl. No.: 15/903,014

(22) Filed: Feb. 22, 2018

(65) Prior Publication Data

US 2019/0060849 A1    Feb. 28, 2019

Related U.S. Application Data

(60) Provisional application No. 62/462,310, filed on Feb. 22, 2017.

(51) Int. Cl.
| | |
|---|---|
| *A47J 43/27* | (2006.01) |
| *B01F 3/08* | (2006.01) |
| *B01F 13/10* | (2006.01) |
| *B01F 5/04* | (2006.01) |
| *B01F 13/00* | (2006.01) |

(Continued)

(52) U.S. Cl.
CPC ............ *B01F 3/0865* (2013.01); *A23L 2/56* (2013.01); *A47J 31/005* (2013.01); *A47J 43/27* (2013.01); *B01F 5/0471* (2013.01); *B01F 5/0496* (2013.01); *B01F 13/0022* (2013.01); *B01F 13/1061* (2013.01); *B01F 15/00149* (2013.01); *B01F 15/0429* (2013.01); *B65D 47/06* (2013.01); *B65D 51/2892* (2013.01); *A23V 2002/00* (2013.01)

(58) Field of Classification Search
CPC ........................................... A47J 43/27
USPC .................. 366/142, 160.1–160.3
See application file for complete search history.

(56) References Cited

U.S. PATENT DOCUMENTS

| | | | | |
|---|---|---|---|---|
| 3,506,460 | A | * | 4/1970 | Bayne ............... C02F 1/686 426/320 |
| 4,964,732 | A | * | 10/1990 | Cadeo ............... B01F 15/00142 366/142 |

(Continued)

OTHER PUBLICATIONS

International Search Report in PCT/US2018/019295 dated May 16, 2018.

(Continued)

*Primary Examiner* — David L Sorkin
(74) *Attorney, Agent, or Firm* — John F. Rollins

(57) ABSTRACT

A modular flow monitoring package (MFMP) is provided for use in an additive delivery system. The MFMP may be manufactured as an add-on to be added to an existing additive delivery system, or may be incorporated into a cartridge or container structure. The MFMP includes a flow sensor for sensing flow of a base fluid and user actuator position sensors for sensing the position of one or more user actuated additive flow adjustment levers. A visual display, which may comprise an array of multi-color LED's may convey information to a user that is relevant to a user's use of the additive delivery system or the user's nutritional needs. Such information may include a current dosage of additive, being delivered, whether a recommended dosage of additive has been consumed, remaining life of a cartridge or supply of additive, and other data relative to health or performance monitoring.

17 Claims, 13 Drawing Sheets

(51) Int. Cl.
  B01F 15/04 (2006.01)
  A23L 2/56 (2006.01)
  A47J 31/00 (2006.01)
  B01F 15/00 (2006.01)
  B65D 47/06 (2006.01)
  B65D 51/28 (2006.01)

(56) References Cited

U.S. PATENT DOCUMENTS

| | | | |
|---|---|---|---|
| 5,419,445 A | 5/1995 | Kaesemeyer | |
| 5,641,410 A * | 6/1997 | Peltzer | B01J 19/0006 137/5 |
| 5,993,671 A * | 11/1999 | Peltzer | C02F 1/008 137/5 |
| 6,224,778 B1 * | 5/2001 | Peltzer | C02F 1/008 137/3 |
| 6,923,568 B2 * | 8/2005 | Wilmer | B01F 5/0451 366/152.1 |
| 2004/0116036 A1 | 6/2004 | Nugent et al. | |
| 2006/0021919 A1 | 2/2006 | Olson et al. | |
| 2008/0099487 A1 | 5/2008 | Winn | |
| 2011/0290678 A1 | 1/2011 | Simonian et al. | |
| 2013/0319915 A1 | 12/2013 | Gellibolian et al. | |
| 2014/0230659 A1 * | 8/2014 | Waggoner | A47J 31/005 99/323 |
| 2015/0065587 A1 * | 3/2015 | Ochoa | A23L 33/10 514/789 |
| 2016/0159632 A1 | 6/2016 | Wheatley et al. | |

OTHER PUBLICATIONS

Written opinion of the ISR Authority in PCT/US2018/019295 dated May 16, 2018.

* cited by examiner

ADDITIVE DELIVERY CONTROL SYSTEMS AND METHODS

PRIORITY CLAIM AND REFERENCE TO RELATED APPLICATIONS

Priority is claimed under all applicable laws, treaties, conventions and regulations, based on U.S. Provisional Application No. 62/462,310 titled DELIVERY SYSTEMS, filed on Feb. 22, 2017. The subject matter described in that application is incorporated herein by reference in its entirety. Where an element or subject matter of this application or a part of the description, claims or drawings in the aforementioned provisional application is not otherwise contained in this application, that element, subject matter or part is incorporated by reference in this application for the purposes of any and all applicable rules, procedures or laws.

STATEMENT REGARDING COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Technical Field

The disclosure relates to dispensing and delivery systems for beverages and other products. The disclosure further relates to dispensing and delivery systems in which an additive, such as flavorings, concentrates or supplements, may be provided in replaceable cartridges and mixed with a base fluid, such as water, as the base fluid is dispensed and/or consumed from a container and wherein one-way flow of base fluid is provided to prevent additive from mixing with the base fluid supply, which may thus be used with different additive delivery systems. The disclosure further relates to dispensing and delivery systems that provide for user adjustment of the amount of additive that is mixed with the base fluid. The disclosure further relates to user interfaces and user interface features for enabling user monitoring and control of additive dosage mixed with a base fluid during dispensing. The disclosure further relates to systems and methods for guiding user decisions on additive dispersing based on various inputs including but not limited to gender, height, weight, genetic makeup, hydration and electrolyte levels, historical nutritional and exercise information, and real-time activity information provided by smartphones, fitness trackers, smart devices, etc. The disclosure further relates to methods of utilizing additive dosage adjustment features in nutritional applications, for example, to enhance performance in athletic and other activities by humans.

2. Prior Art

Additive delivery systems for providing a user-adjusted flow of an additive to a flow of as it is dispensed from a container are generally known. Such systems may be applied to beverage mixing and may incorporate removable cartridges for storing a supply of the additive, such as flavoring, to be added to a base fluid, such as water. Example devices and methods are disclosed in US Published Application No. 2017/0296988, published on Oct. 19, 2017 titled ADJUSTABLE ADDITIVE CARTRIDGE SYSTEMS AND METHODS and U.S. Pat. Nos. 9,498,086 and 9,795,242.

There is a need to enhance the user interface and additive dosage monitoring and control features of additive delivery systems, such as those described in the aforementioned publications. There is a further need to utilize such user interface and additive dosage monitoring and control features to support and make recommendations regarding changing, real-time nutritional needs and general well-being, for physical activities (including athletic activities.)

SUMMARY

According to one aspect of the disclosure, a modular flow monitoring package (MFMP) is provided for use in an additive delivery system. The MFMP may be manufactured as an add-on to be added to an existing additive delivery system, or may be incorporated into a cartridge or container structure. The MFMP may include a flow path defined thru it, and an outer housing that protects internal components. A tube defines a flow-thru path in the housing. A flow rate monitoring device is provided for sensing flow in the tube and may comprise a magnetic turbine, which cooperates with a Hall effect sensor and supporting circuitry housed within the housing and mounted on an internal circuit board. An internal power supply and an inductive charging circuit may be incorporated into the MFMP. The inductive charging circuit may include a wire coil extending within or just inside an outer wall of the housing. The coil can be an air core wound wire or a printed circuit coil routed about the outside diameter of the printed circuit board to form a printed circuit coil. The MFMP also includes user actuator position sensors for sensing the position of one or more user actuated additive flow adjustment levers or other structures. It should be noted that a single digital magnetic sensor can also be used to sense the position of all three magnetics by mapping these fields and noting the feedback based on each location and positioning possibility. A visual display, which may comprise an array of multi-color LED's is incorporated into the MFMP and may be on an upper wall thereof so as to be visible to a user when the MFMP is in an installed position in an additive delivery system. The visual display may convey information to a user that is relevant to a user's use of the additive delivery system or the user's nutritional needs. Although we demonstrate individual LED's other display technologies may be incorporated to allow such positioning feedback. This information can also be indicated via the mobile application. Such information may include a current dosage of additive, being delivered, whether a recommended dosage of additive has been consumed, remaining life of a cartridge or supply of additive, and other data relative to health or performance monitoring. The MFMP may be adapted to monitor more than one additive being supplied to a base fluid and corresponding number of additive cartridges. Additionally, the type of dose can be manually selected or optionally detected by an RFID reader that reads the package ID, mfg. dates, use by dates and type of product for identification and authentication. This information will be password protected much like the ATMEL TK5551 RFID transponder relating to package information to be displayed.

According to another aspect, the MFMP may communicate with external devices and systems to enhance the user experience. Such devices may include smartphones, exercise equipment, heart rate and blood pressure monitors, fitness trackers and "smart" devices, such as computer-equipped exercise equipment. Additional mobile information may be displayed that the product may not or cannot displayed. Information that may be displayed includes total dosage over periods of time, consumption accumulators and dosage accumulators. Relevant dosage information may be utilized in combination with a personal profile, hydration and electrolyte levels, historical nutritional and exercise information, and real-time activity information to develop tailored dosage recommendations for a user. Smartphone apps or other applications for computing platforms may be utilized to facilitate user interaction with the MFMP. A use-case for this application could be an individual who participates in cycling on a regular basis. By measuring performance data including speed, peak output, distance covered, heart rate, lactic acid production (measured through fitness trackers, onboard bicycle computers, and other smart devices) and comparing this to additive data (e.g. electrolyte dosage) for the same periods of time, correlations to optimal electrolyte dosage could be obtained and relayed to the user through the application.

According to another aspect, a recommendation system utilizing the MFMP may accept a number of data sets as input to determine real-time hydration and nutritional needs of a user and may make recommendation on additive dosage in real-timer as a user is engaged in physical activity.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

FIG. 8 is a detail of an example user interface for indicating additive levels, charge capacity and end-of-life conditions of an example MFMP according to aspects of the invention.

DETAILED DESCRIPTION

Figure 1:
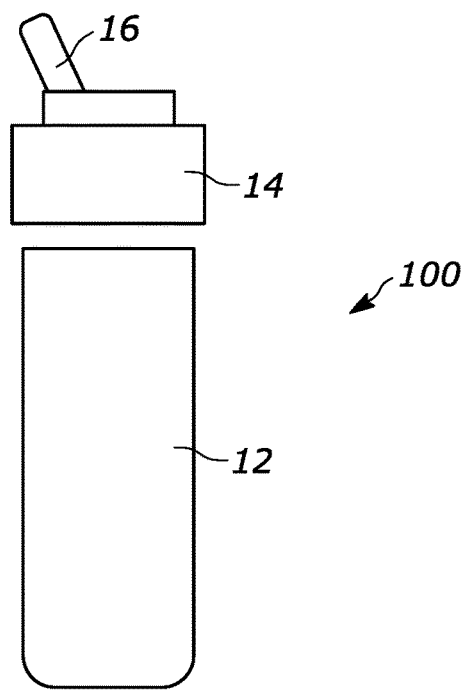
FIG. 1 is a front, exploded view of an example dispenser environment suitable for application of the invention.
Figure 2:
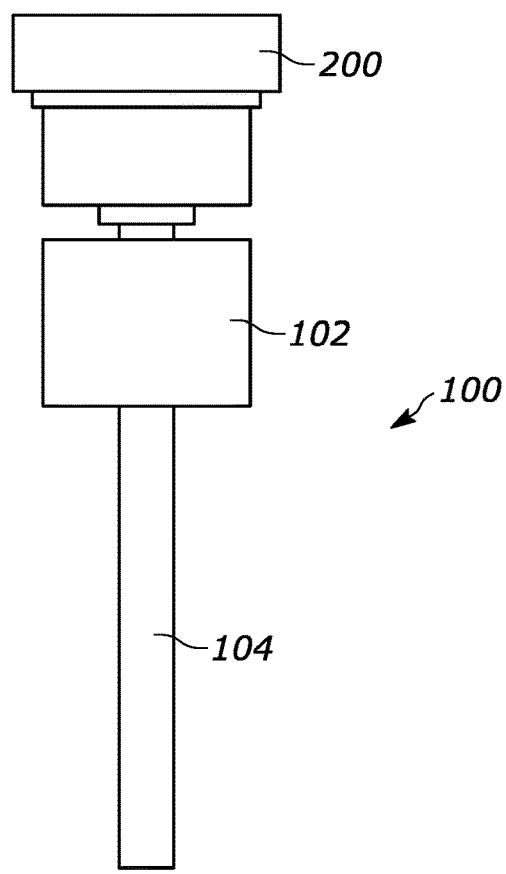
FIG. 2 is a front assembled view of an example internal additive delivery system comprising an MFMP according to an aspect of the invention.

FIG. 1 is a front, exploded view of an example dispenser environment 10 suitable for application of a MFMP according to aspects of the invention. A dispenser, such as a drinking water bottle, may include a container body 12 defining an interior volume for containing a base fluid (water) and a screw-fit cap 14 having a spout 16. Referring additionally to FIG. 2, and additive delivery system 100 may be cooperatively associated with the dispenser environment 10. The additive delivery system 100 may include an intake tube 104 for conveying base fluid upward and through an annular cartridge 102 disposed around the intake tube 104. The cartridge may include a port on an interior thereof (not shown in FIG. 2) which communicates additive into a mixing zone within the but 104. The rotational position of the cartridge 102 may be adjusted by a user using an actuator, in a manner that will be described, to adjust the amount of additive being added to the base fluid as the base fluid flows in the intake tube 104. According to aspects of the invention, a modular flow monitoring package (MFMP) 200 may be cooperatively associated with the additive delivery system 100 for enhancing user monitoring and control of the additive monitoring the dosage of additive.

Figure 3:
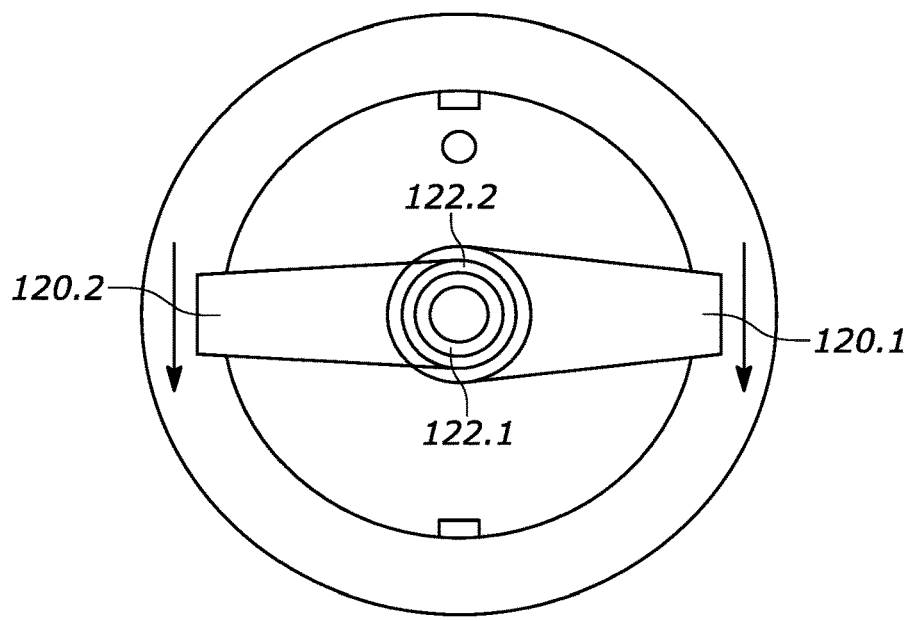
FIG. 3 is a top view of a dual cartridge additive delivery system environment suitable for application of an MFMP according to an aspect of the invention.
Figure 4:
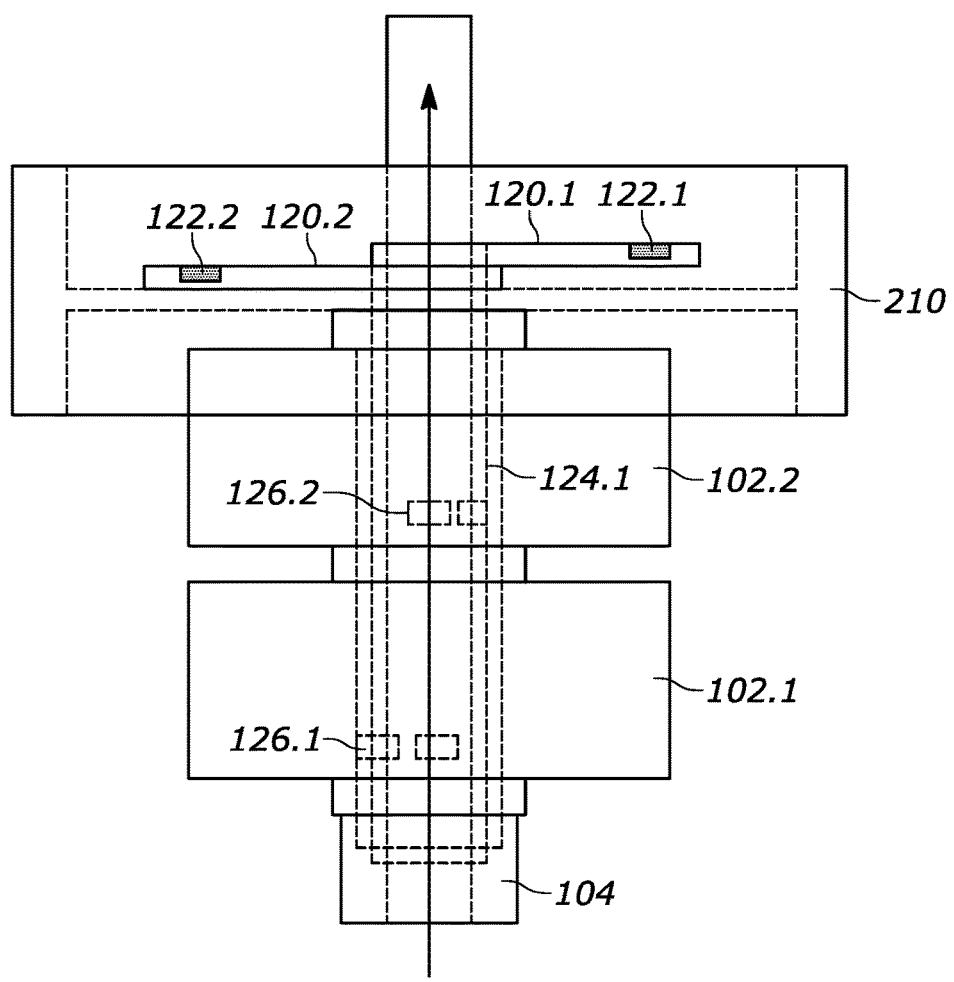
FIG. 4 is a front view of the dual cartridge additive delivery system of FIG. 3.

FIGS. 3 and 4 depict details of an example dual cartridge additive delivery system that may be a suitable environment for use of the MFMP according to aspects of the invention. FIG. 3 is a top view and FIG. 4 is a front view. First and second cartridges 102.1 and 102.2 may be cylindrical, annular containers disposed concentrically relative to intake tube 104. Each may have a port 126.1 and 126.2 to permit flow of respective additives from an interior space into the intake tube for mixing with a base fluid. The respective flows of additive from the cartridges 102.1 and 102.2 may be controlled with control arms 120.1 and 120.2 which are attached to annular stems 124.1 and 124.2 that extend concentrically downward and may have ports defined for selective alignment with respective ports on the cartridges 102.1 and 102.2. Rotational movement of the control arms 120.1 and 120.2 thus may result in adjustment of the respective flows of additive from cartridges 102.1 and 102.2 into the flow path of base fluid within the intake tube. Control arms may include magnetic elements 122.1 and 122.2 for enabling their actuation/movement to be controlled from outside the sealed housing 210 in which they reside. Cartridges 102.1 and 102.2 may be provided with machine readable identifying information, including RFID tags, bar codes or other electronically stored information that may identify cartridge type, flavor type, date and other useful information to the MFMP. Suitable reading components may be incorporated into the MFMP to read the machine readable identifying information.

Figure 5:
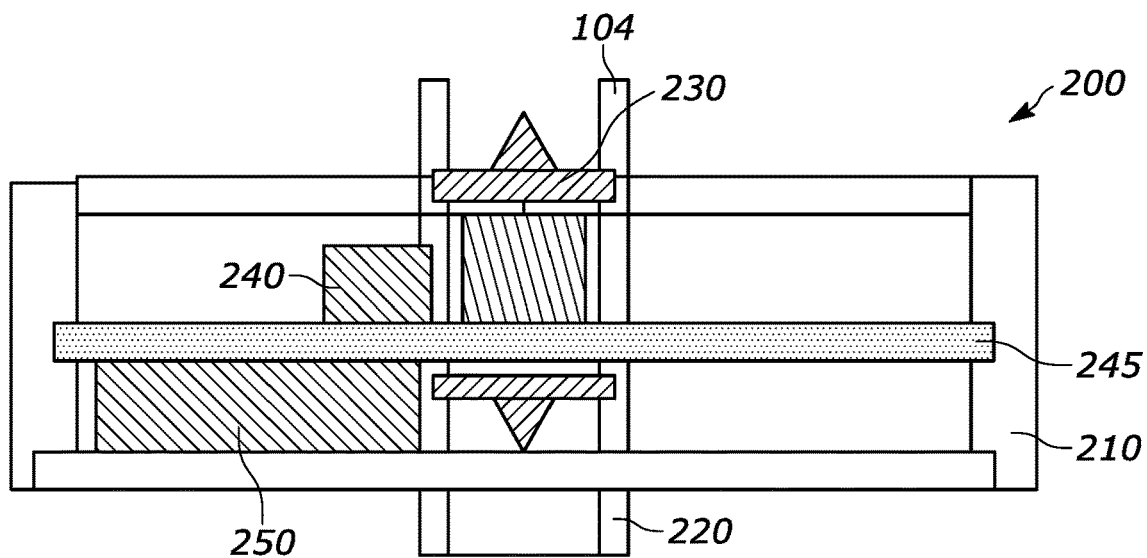
FIG. 5 is cross-sectional view of an example MFMP according to aspects of the invention.

FIG. 5 is a cross-section showing further details of an example MFMP 200. A flow rate measuring device 230, which may be a magnetic turbine, may be centrally located and mounted for rotational movement in response to fluid flow within tube 104. A Hall effect sensor 240 may be mounted to detect the rotational rate of the turbine 230 such that data representing the flow rate of base fluid within tube 104 may be obtained. A power supply 250, such as a battery, provides electrical energy for operation of the internal components of the MFMP 200, which may be sealed within a housing 210. A circuit board 245 may support the battery 250, sensor 240 as well as support electronics that may include a microprocessor, memory, drivers for the visual indicators and radio components for communicating to receivers outside of the housing interior. A cartridge reader, which may include an RFID reader, may also be present on the circuit board to sense the identify of one or more cartridges being used. An inductive charging coil 211 may be installed within or adjacent to an outer wall of housing 210 for enabling inductive charging of the power supply 250.

Figure 6:
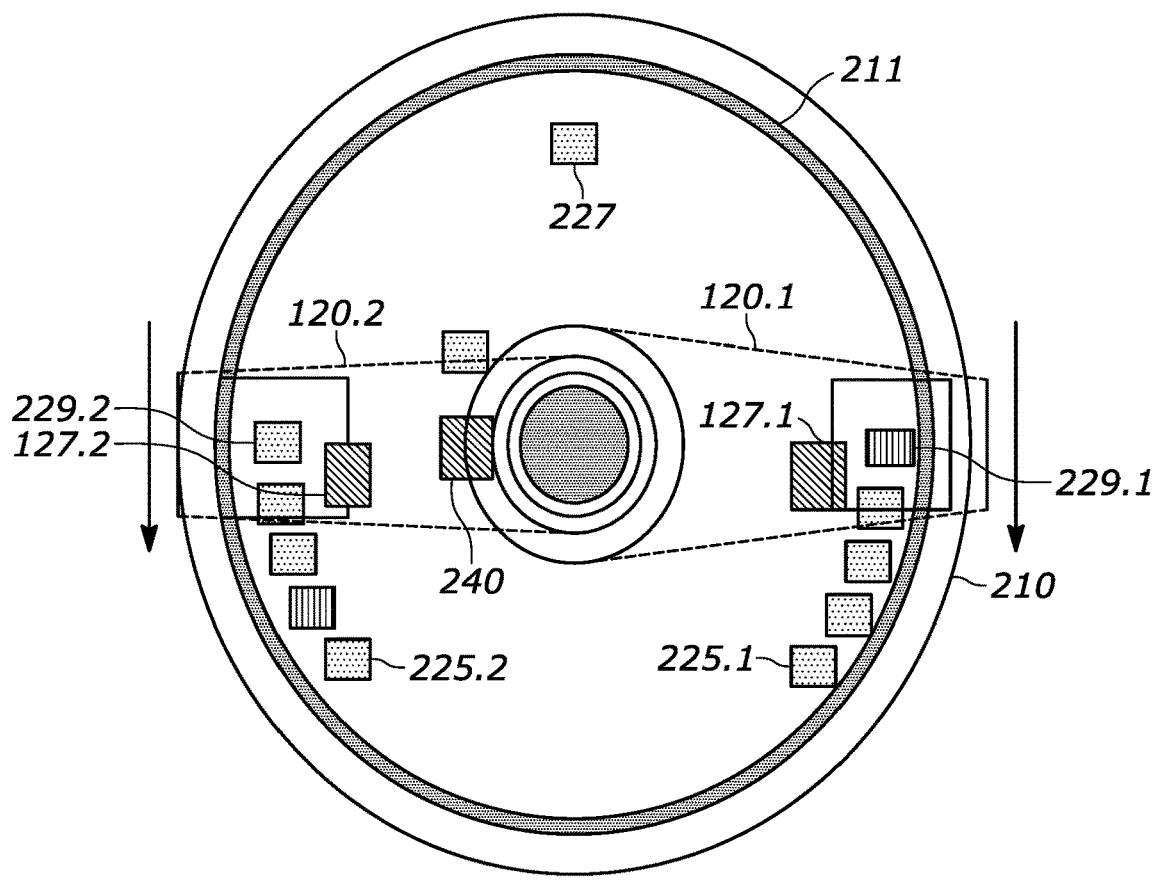
FIG. 6 is a top view of an example MFMP.

FIG. 6 is a top view of an example MFMP, which includes a number of visual indicators 225 mounted such that they may be visible to a user from outside the housing and when the unit is installed on an additive delivery system. An upper wall of housing 210 may be made of a clear, transparent material to permit viewing of the visual indicators, which may be mounted on an internal circuit board. Respective sensing magnets 127.1 and 127.2 may be included to sense the rotational position of control arms 120.1 and 120.2. Visual indicators may include an indicator set (four per set shown in FIGS. 6) 225.1 and 225.2 for each cartridge, such as a plurality of discrete light sources, such as LED's, which may be multicolored. As will be explained, indicator sets 225.1 and 225.2 convey information regarding the additive dosage relative to each cartridge to a user. Other indicators may be present, including a charge indicator 227 to indicate the level of charge on the power supply 250. Respective end-of-life (EOL) indicators 229.1 and 229.2 may be associated with each cartridge indicator set to indicate the EOL of a cartridge.

Figure 7:
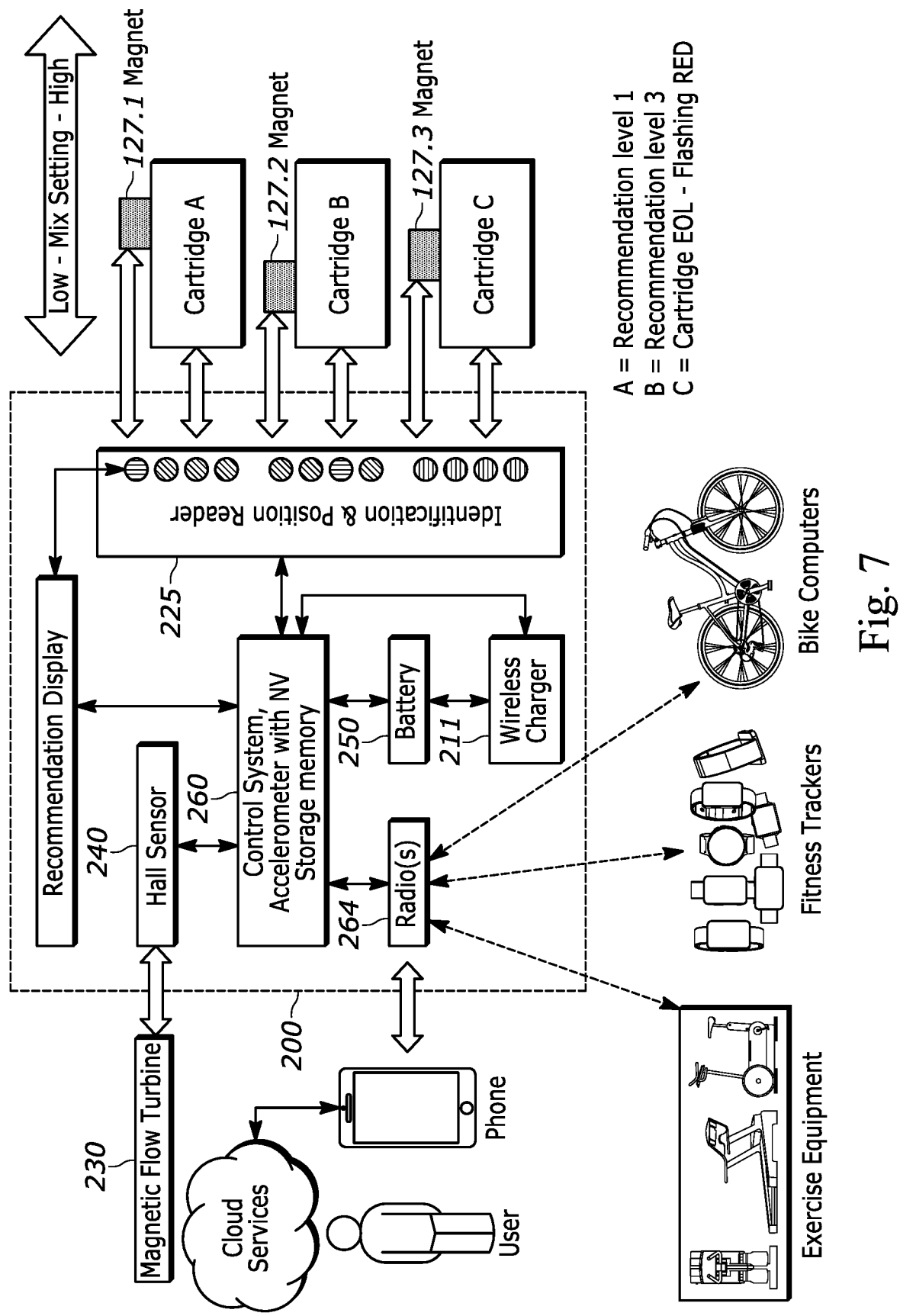
FIG. 7 is a schematic diagram of a system for utilizing an MFMP according to aspects of the invention.

FIG. 7 is a schematic diagram of a system for utilizing an MFMP according to aspects of the invention. The components of the example MFMP are represented in box 200. In this implementation, three cartridges may be utilized and monitored by the MFMP in an additive delivery system. A central, microprocessor-based control system 260 may include non-volatile memory and an accelerometer and receives inputs from the Hall sensor 240, which inductively senses the rotational rate of turbine 230, and actuator arm position sensors 127.1, 127.2 and 127.3. Control system 260 also controls a radio interface 264 and wireless inductive charger 211, as well as the visual indicator sets 225.

According to aspects of the invention, the MFMP 200 may interface with exercise equipment, fitness trackers and bike computers via radio interface 264. Radio interface 264 also permits interaction with smartphones running suitable applications direct radio or via a cloud or wide area network. Cartridge data can be read via RFID and a coil is located on the printed circuit board. Each cartridge may have an RFD chip with specific type and product data. Venturi positions for dose are tracked magnetically. By keeping sensors and the electronics intrinsically separate we can design a ultrasonically sealed watertight electronics package for reliability and ease of use.

Figure 8:
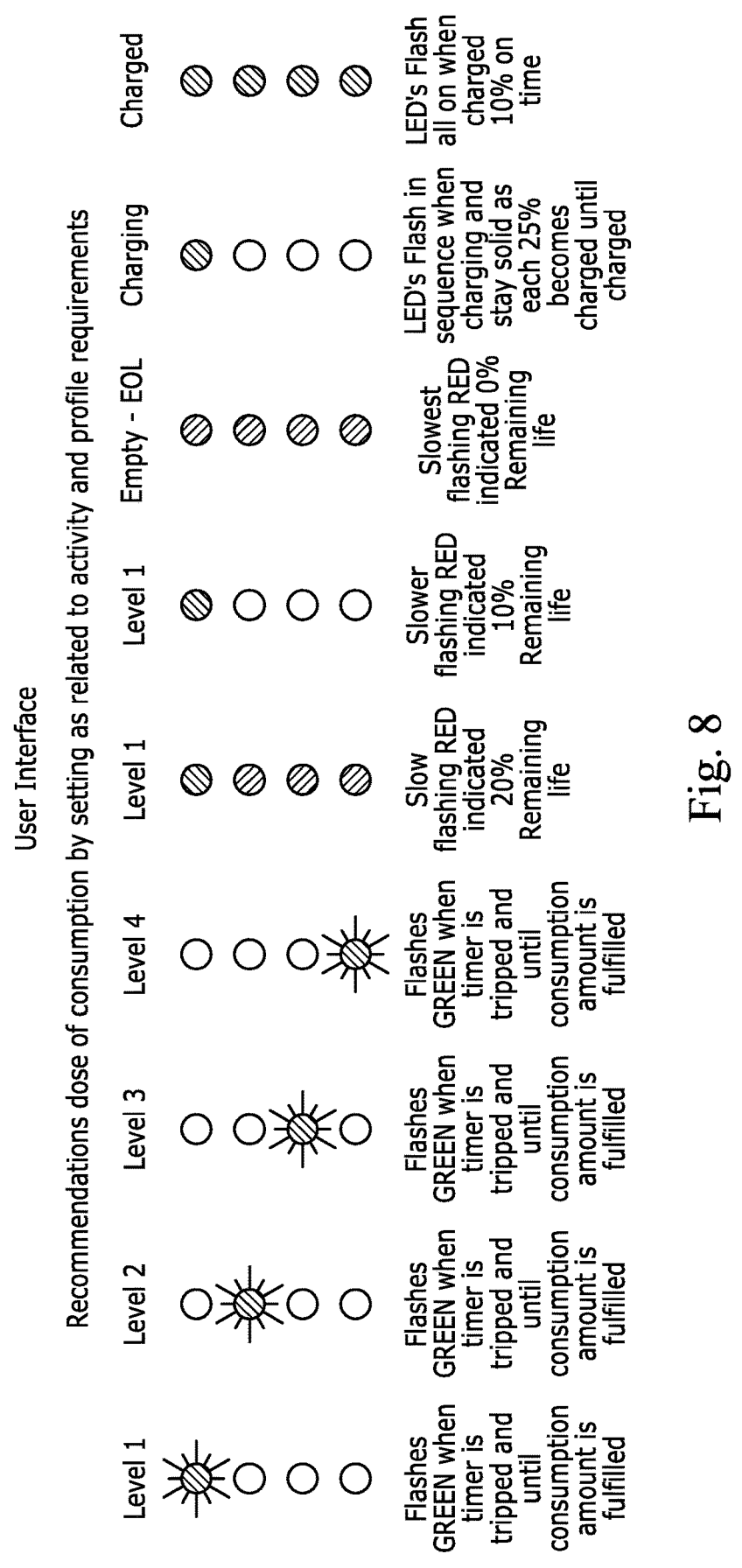

FIG. 8 illustrates an example set of patterns for visual indicator sets to indicate status and recommend consumption and dosages of additive. Flashing indicators may be used to indicate that a user should consume. The communication language will show the recommended dosage for your activity level. By indicating end of life, recommended dose and present dose we can modify dose behavior based on historical performance and present activity. In this example we show the present recommendation as flashing but we may also show the present setting at the same time as a solid. The display also is designed to show life for the cartridge by indicating % of life. These same gas gauge type indicators can be used to show state of charge (battery life remaining 0-100%) and charging state (percentage of charge 0-100%).

Figure 9:
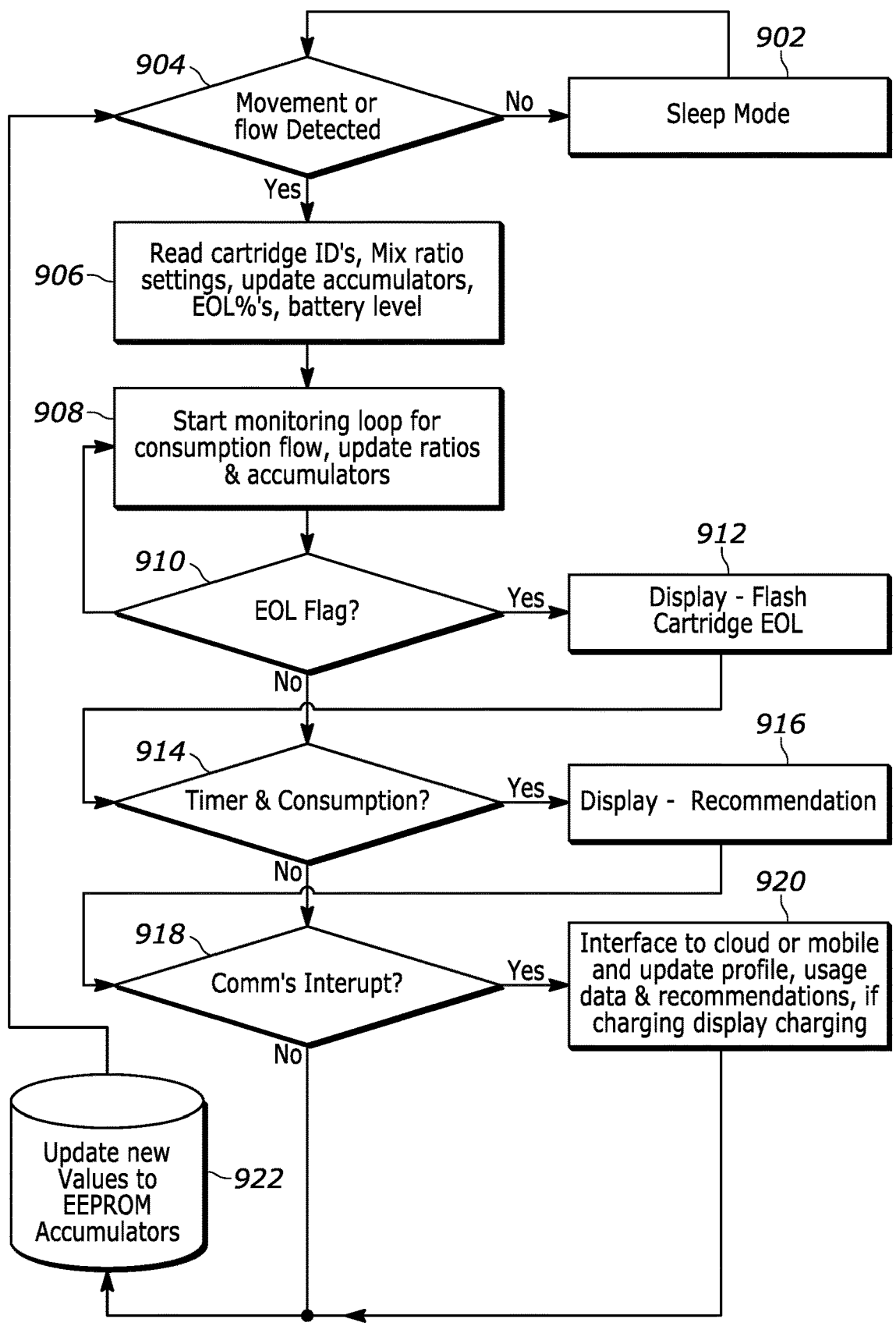
FIG. 9 is a flow diagram of an example logic flow for an MFMP according to aspects of the invention.

FIG. 9 illustrates an example logic flow. The MFMP may typically default to a sleep mode at step 902. If movement is detected at 904, the logic proceeds to step 906, if not, the logic loops to 902. At 906, cartridge identifiers are read, mix ratio settings may be read from a profile stored in memory, accumulated values, such as volume, calories consumed may be updated, EOL percentages are computed and battery level is sensed. At 908, a monitoring loop is initiated to check for consumption flow and update accumulated values and ratios. At 910, the logic checks for an EOL flag being indicated. This may be determined by an accumulated value of additive being compared to a known additive supply. If yes, at 912, the visual indicator are activated to indicate EOL for the given cartridge and the logic flows to step 914. If no EOL is flagged at 910, the logic goes directly to decision 914. At 914, the logic checks whether a timer and consumption mode is desired. At this point the decision is made to trigger alarms and notifications. The timers are based on flow and consumption time as it relates to the dose setting. The comparison data can be preset, set over the application of brought in through the RFID data. It is ideal to have the consumption tables come in with the cartridge and reset as the new cartridge is installed. If the use accumulator using flow, and dose timer accumulators when converted to uL or mL are greater than the use table values end of life is indicated. If so, a recommendation is made using the indicators at 916 and notification flags are sent to the mobile device and/or cloud. At 918, a check is made as to whether the communication is interrupted. At 920, the system interfaces to the cloud or mobile device to update a profile, usage data and recommendations as well as displaying charging indicator of the unit is charging. At 922, new values are updated in an accumulator such as EEPROM. The dose, flow rate and time flowing are accumulated for end of life comparison. This accumulated value is stored in two places as to prevent loss of data and is updated in non-volatile memory after each use. These accumulators are also for overall flow, flow by dose counters and overall use of cartridge accumulators (using flow, dose over time) to get to uL or mL of use per drink.

Figure 10:
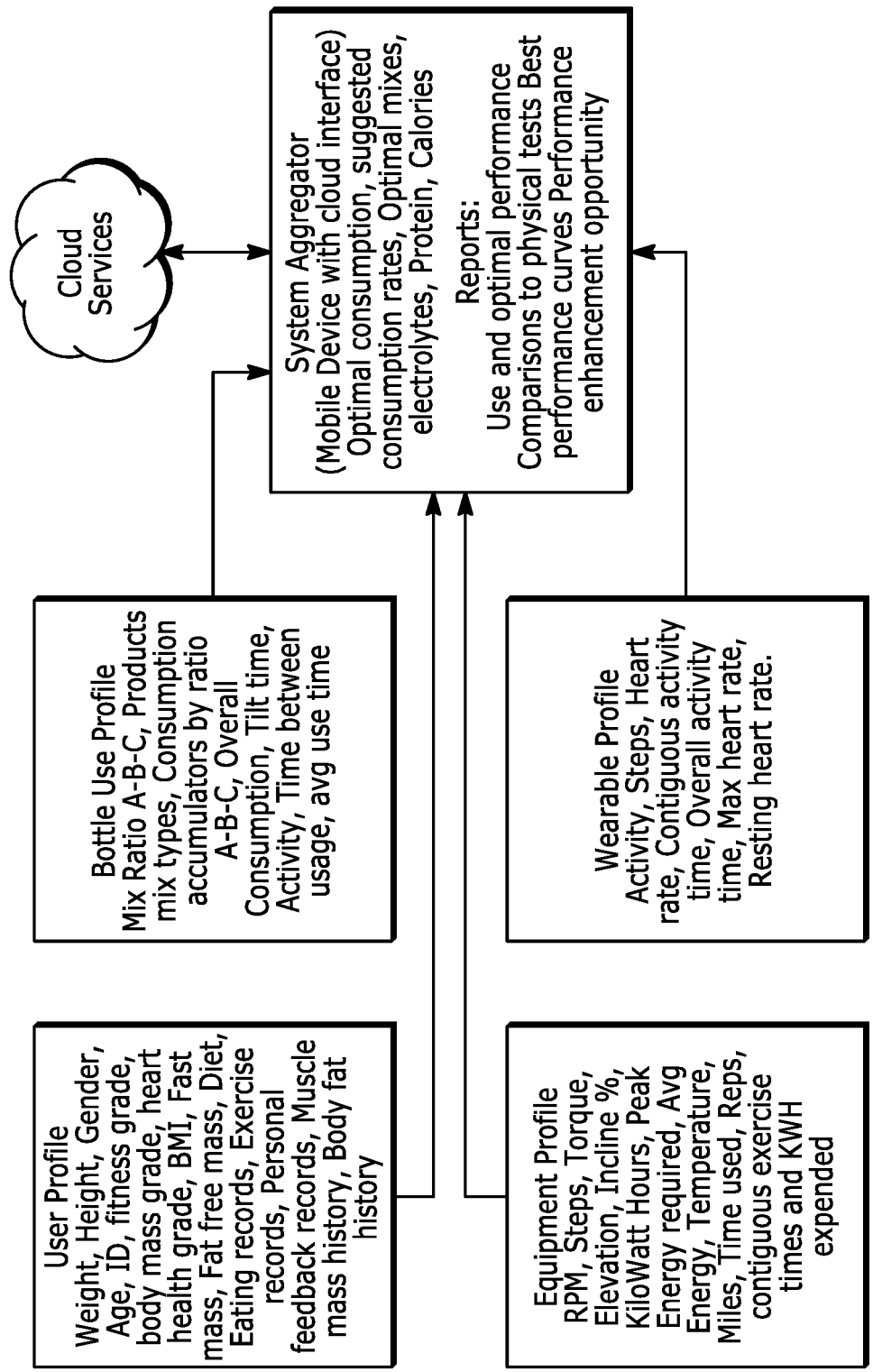
FIG. 10 is a representation of example data fields that may be monitored or input into systems utilizing an MFMP according to aspects of the invention.

FIG. 10 is a representation of example data sets that may be monitored or input into systems utilizing an MFMP according to aspects of the invention. A user profile data set may include height, weight, gender, age, ID Weight, Height, Gender, Age, ID, fitness grade, body mass grade, heart health grade, BMI, Fast mass, Fat free mass, Diet, Eating records, Exercise records, Personal feedback records, Muscle mass history, Body fat history. A bottle use profile may include stored preferred mix ratios, additive product types, consumption accumulators by ratio A-B-C, overall consumption, tilt time, activity, time between usage, average use time. An exercise equipment profile may include parameters for a given exercise equipment including RMP, number of steps, torque, elevation, incline percentage, kilowatt hours, peak energy required, average energy, temperature, miles, time used, reps, contiguous exercise times and KWH expended. A wearable profile may include activity, steps, heart rate, contiguous activity time, overall activity time, max heart rate, resting heart rate. A system aggregator, which may be a mobile application or a cloud services based application may receive the data sets as input to generate optimal consumption, suggested consumption rates, optimal mixes, electrolyte levels, protein and caloric intake recommendations. The aggregator may also generate or permit the user to generate reports on use and optimal performance, comparisons to physical tests, best performance curves, performance enhancement opportunities, etc.

When using the accelerometer the device itself can track walking and running gates and can utilize this information and relate it to a mobile device.

Figure 11:
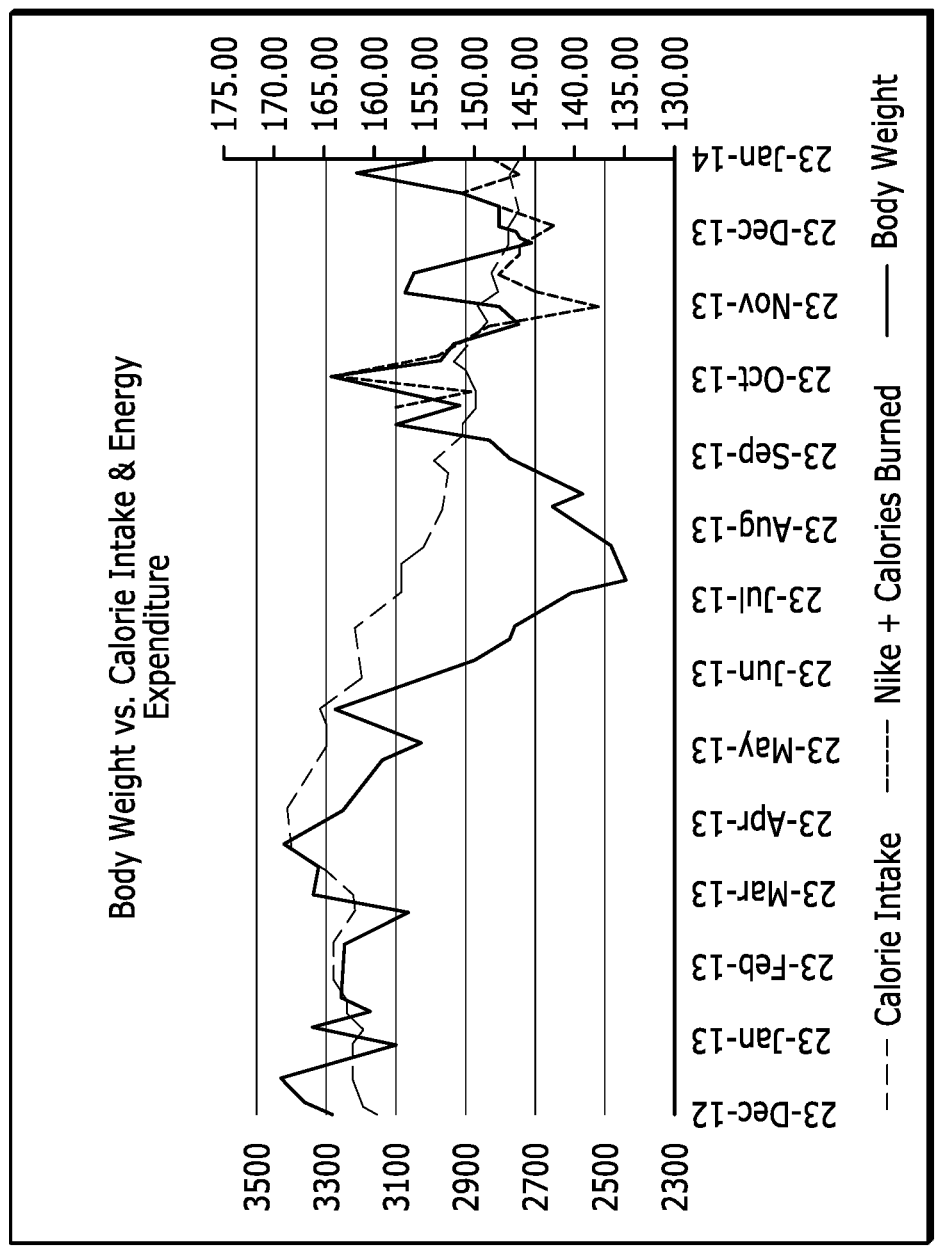
FIG. 11 depicts an example data set of daily activity, calorie intake and calories burned as well as body weight that may be utilized in a system according to aspects of the invention.

FIG. 11 depicts an example data set of daily activity, calorie intake and calories burned as well as body weight that may be utilized in a system according to aspects of the invention.

Figure 12:
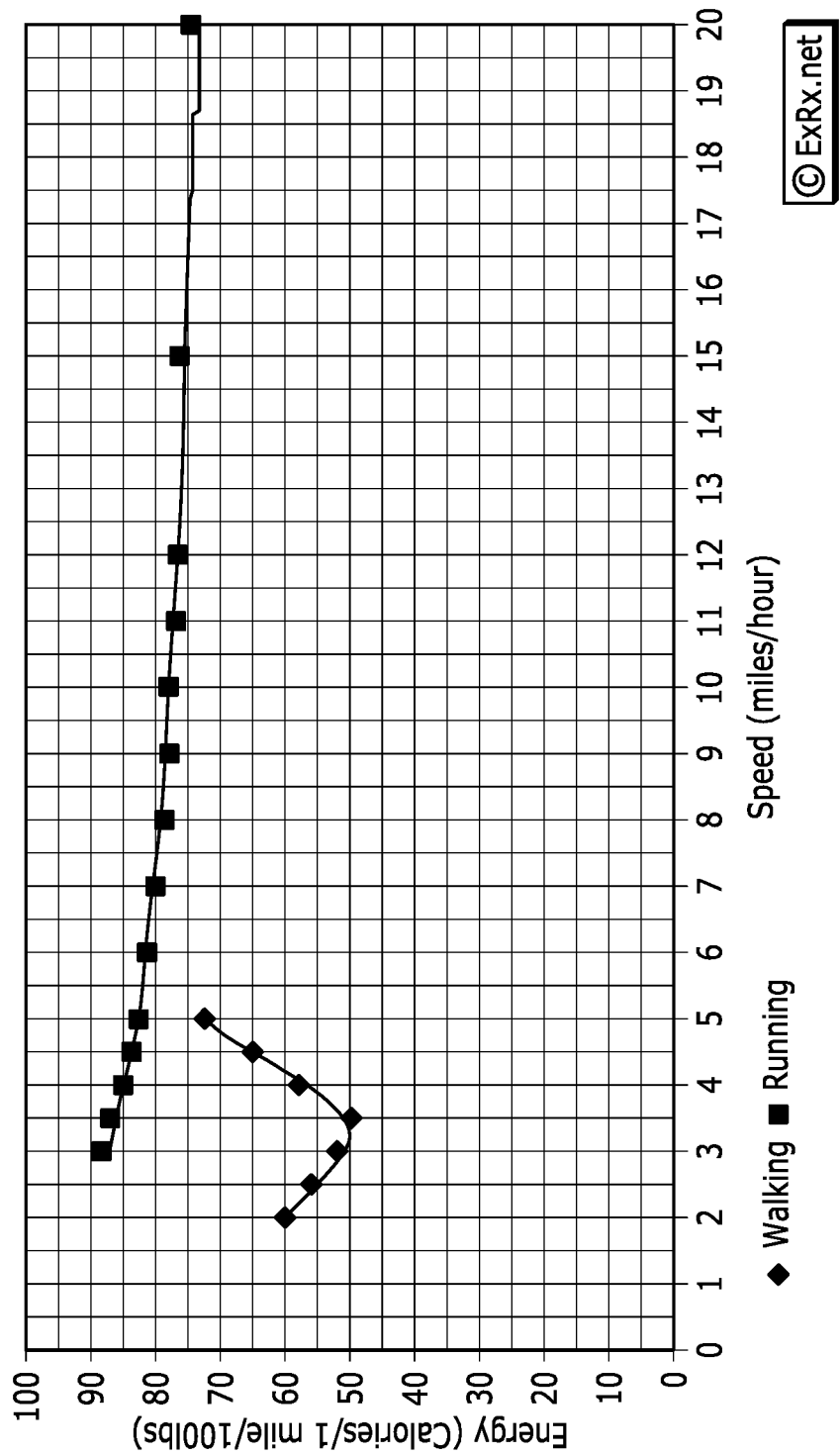
FIG. 12 depicts an example data set of energy (calories) expended as a function of walking or running speed that may be utilized in a system according to aspects of the invention.

FIG. 12 depicts an example data set of energy (calories) expended as a function of walking or running speed that may be utilized in a system according to aspects of the invention.

Figure 13:
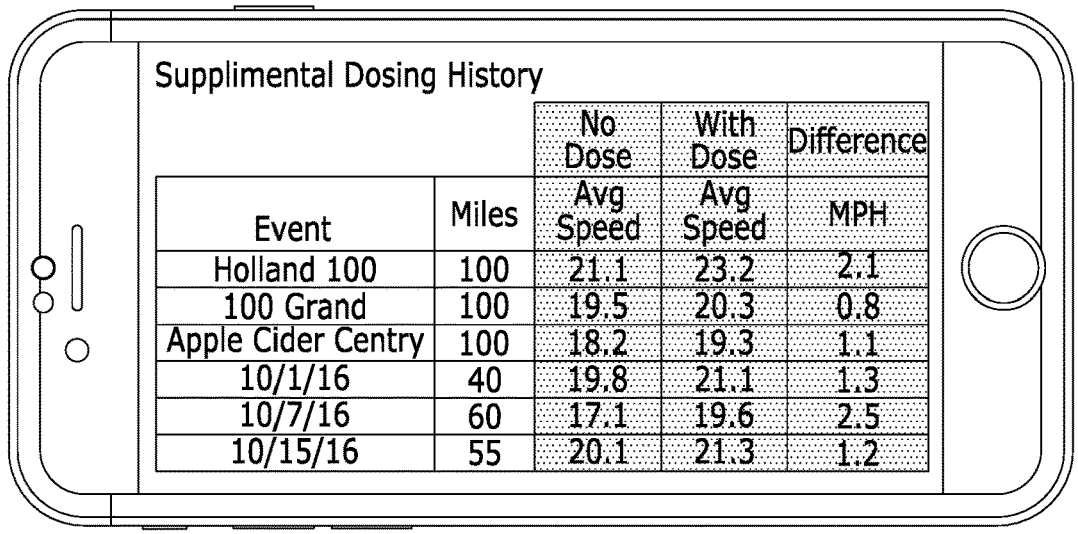
FIG. 13 depicts user interface displays of a medication dosing application on a smartphone according to aspects of the invention.
Figure 13:
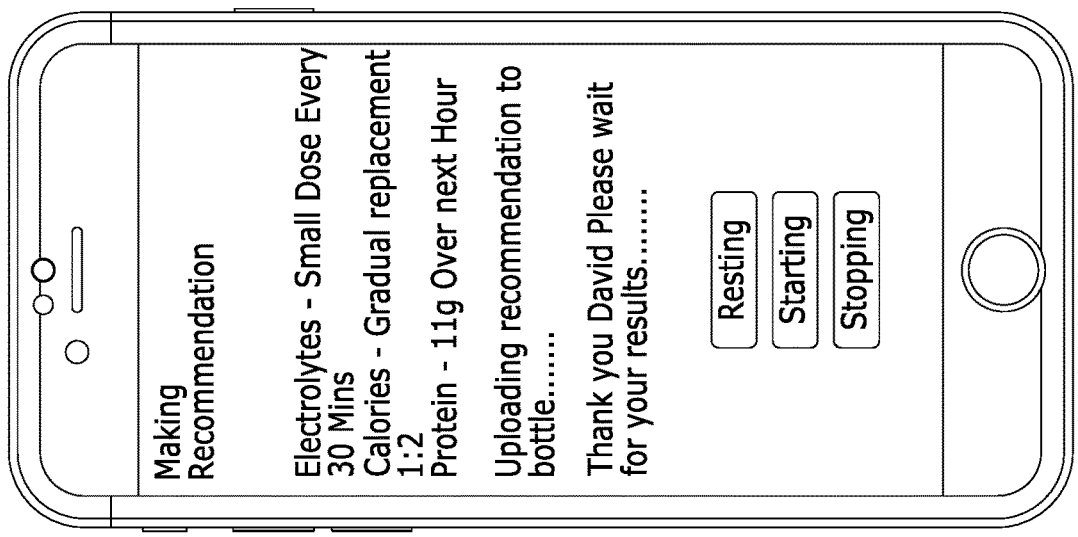
Figure 13:
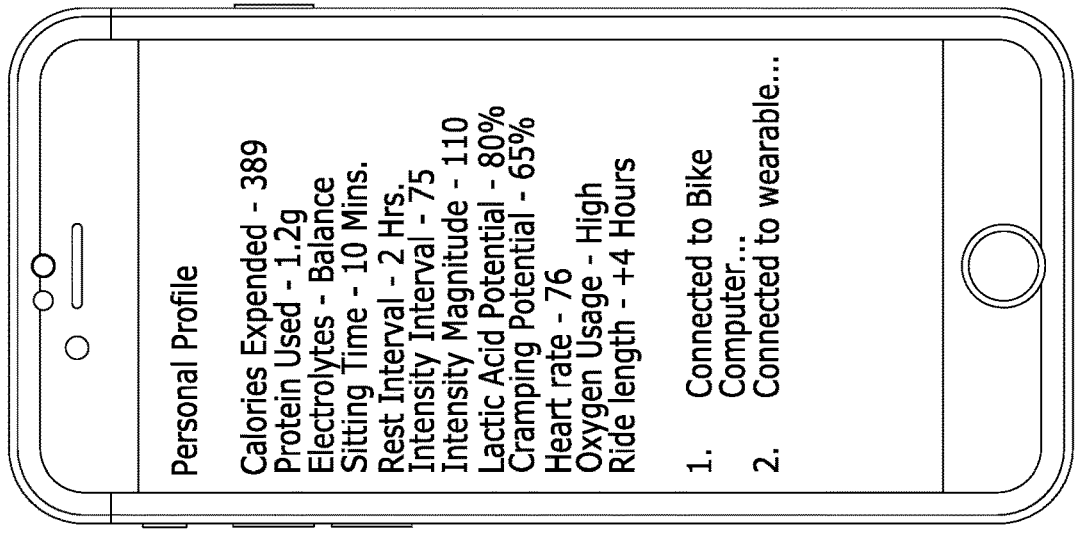

FIG. 13 depicts user interface displays of a dynamic sports application on a smartphone according to aspects of the invention. The application may present an overview screen (left), a recommendation screen (middle) and an historical results screen (right).

Figure 14:
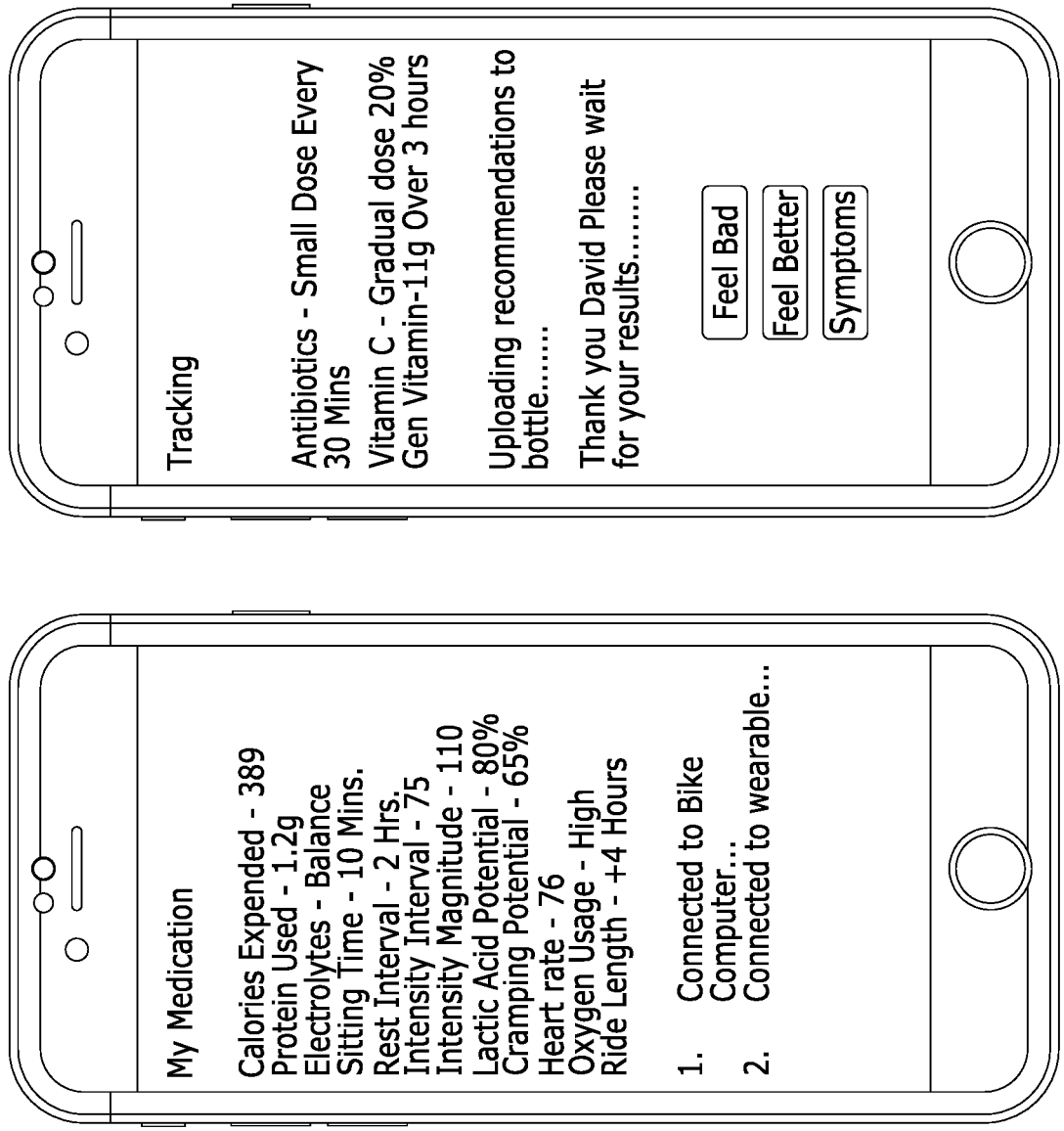
FIG. 14 depicts user interface displays of a diet application on a smartphone according to aspects of the invention.

FIG. 14 depicts user interface displays of a medication delivery application on a smartphone according to aspects of the invention. The application may present an overview screen (left) and a recommendation screen (right).

Figure 15:
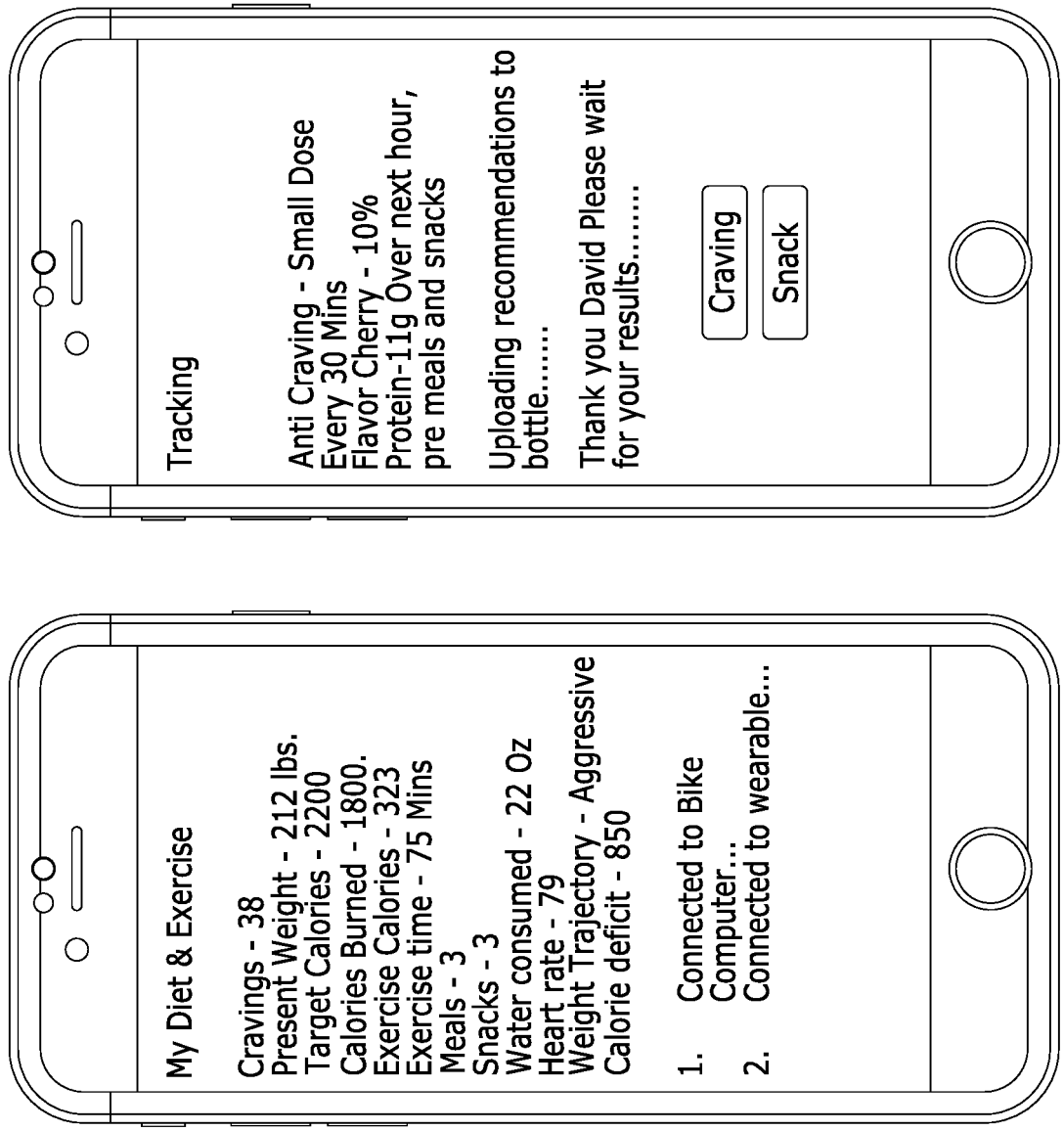
FIG. 15 depicts user interface displays of a flavor and hydration application on a smartphone according to aspects of the invention.

FIG. 15 depicts user interface displays of a diet management application on a smartphone according to aspects of the invention. The application may present an overview screen (left) and a recommendation screen (right).

User interface displays of may also include a flavor and hydration application on a smartphone according to aspects of the invention.

Figure 16:
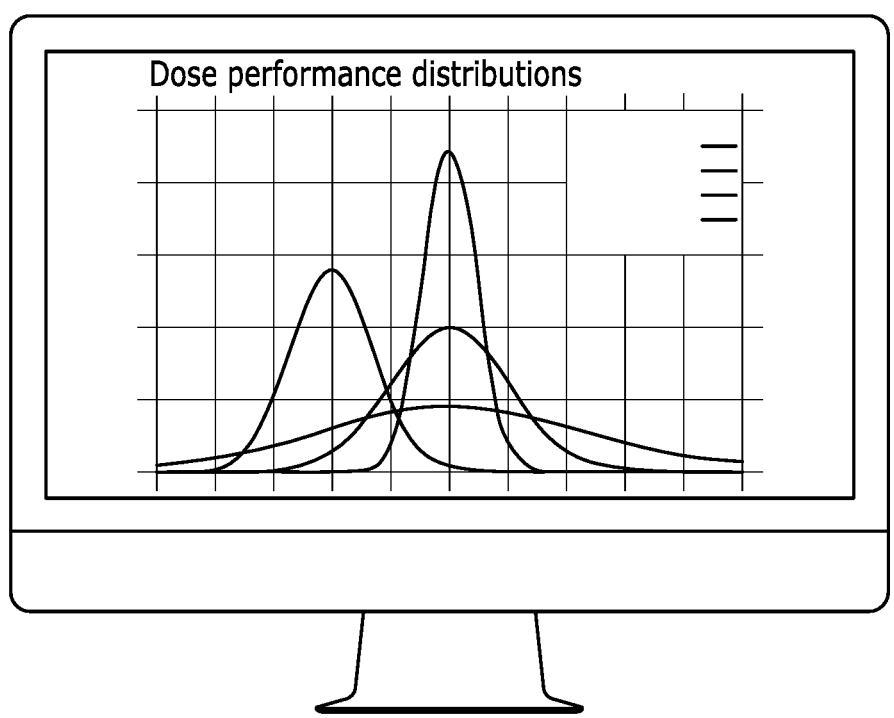
FIG. 16 depicts a user interface display of an application that may display overall statistics and data gathered for best performance according to aspects of the invention.

FIG. 16 depicts a user interface display of an application that may display overall statistics and data gathered for best performance according to aspects of the invention.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents that fall within the spirit and scope of the claims that follow.

The invention claimed is:

1. An additive delivery system comprising:
   an intake tube defining a base liquid flow passage for conveying base liquid through the additive delivery system;
   an additive cartridge having an interior space for containing an additive supply, the additive cartridge defining an additive flow path and an additive cartridge port for permitting flow of additive from the cartridge interior space;
   the base liquid flow passage including a base liquid flow passage port arranged to cooperate with the cartridge port to provide for mixing of additive with the base liquid in response to base liquid flowing in the base liquid flow passage;
   the additive cartridge including a flow adjustment actuator for allowing a user to control the amount of additive mixed with the base liquid as the base liquid flows in the base liquid flow passage;
   the additive delivery system including a flow monitoring package, having a flow monitoring package flow passage defined therein for permitting flow through the flow monitoring package, the flow monitoring package including a flow measuring device for measuring flow in the flow monitoring package flow passage;
   the flow monitoring package further including a sensor for sensing the position of the flow adjustment actuator; and
   the additive delivery system further comprising a user interface for conveying information to the user about the additive.

2. The additive delivery system of claim 1, wherein the user interface includes a visual display for indicating whether a predetermined consumption of additive has been attained.

3. The additive delivery system of claim 1, wherein the user interface includes a visual display for indicating the remaining life of a supply of additive.

4. The additive delivery system of claim 1, wherein the user interface comprises a plurality of discrete optical indicators.

5. The additive delivery system of claim 1, wherein the flow adjustment actuator includes a control arm within a sealed housing, wherein the control arm includes a magnetic element for enabling actuation of the flow adjustment actuator from outside the sealed housing.

6. The additive delivery system of claim 1, wherein the user interface comprises at least one LED.

7. The additive delivery system of claim 1, further comprising an end-of-life indicator for indicating the end-of-life of the cartridge.

8. The additive delivery system of claim 1, wherein the flow measuring device comprises a magnetic turbine and a Hall effect sensor for sensing rotation of the magnetic turbine.

9. The additive delivery system of claim 1, further comprising an identification reader for reading machine readable information associated with the cartridge.

10. The additive delivery system of claim 9, wherein the identification reader comprises an RFID tag reader.

11. The additive delivery system of claim 9, further comprising a position reader for reading the position of a flow control element associated with the cartridge.

12. The additive delivery system of claim 1, further comprising a second cartridge containing a second additive.

13. The additive delivery system of claim 12, further comprising a first control arm adapted to adjust the flow of the first additive from the first cartridge and a second control arm adapted to adjust the flow of the second additive from the second cartridge.

14. The additive delivery system of claim 13, further comprising magnetic element disposed on each of the control arms.

15. The additive delivery system of claim 1, further comprising a power supply.

16. The additive delivery system of claim 1, wherein the user interface includes a visual indicator for displaying recommended dosage related information to a user based on the base fluid flow and the position of the flow adjustment actuator.

17. The additive delivery system of claim 1, further comprising a container for the supply of base liquid, and a container lid for enclosing the container, the additive delivery system being mounted on the container lid.

\* \* \* \* \*